Patented Aug. 24, 1926.

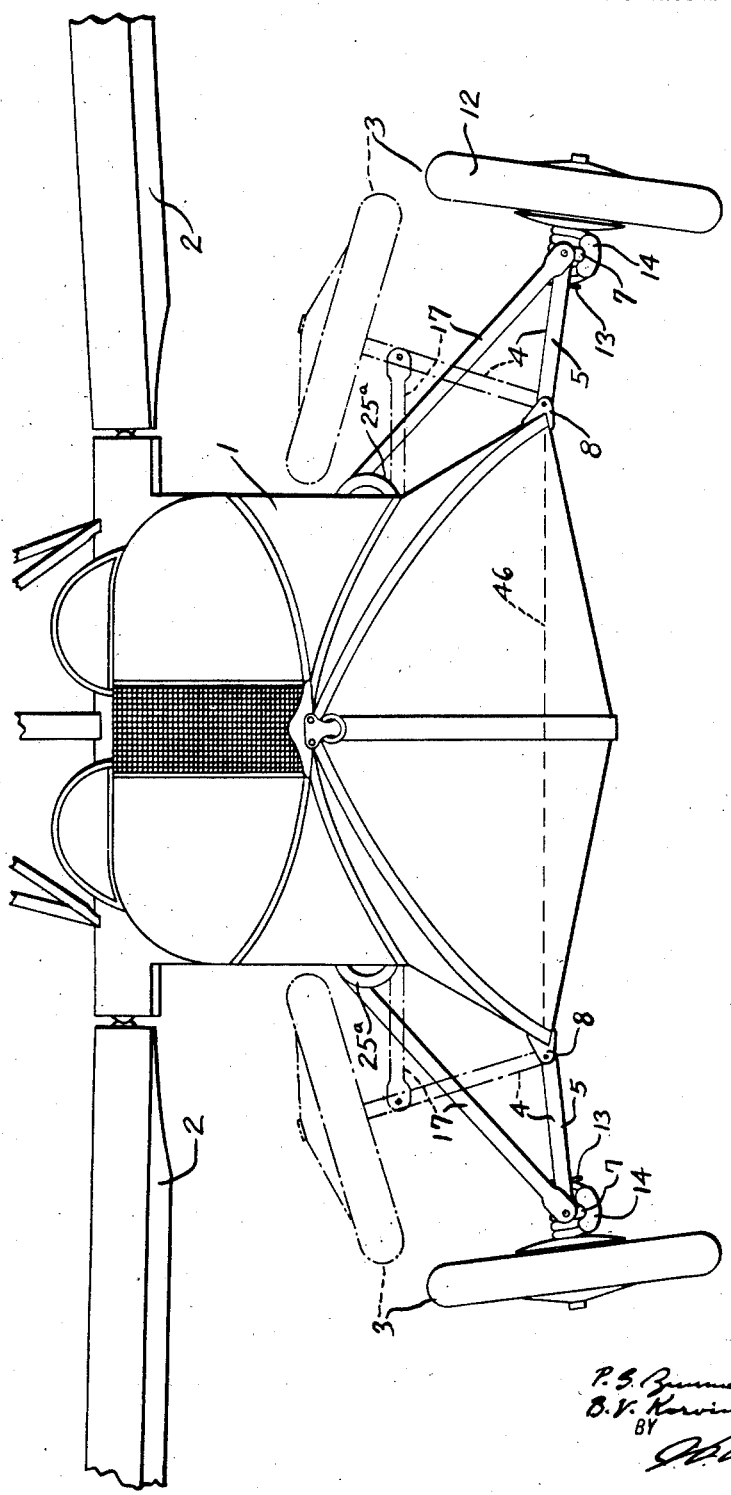

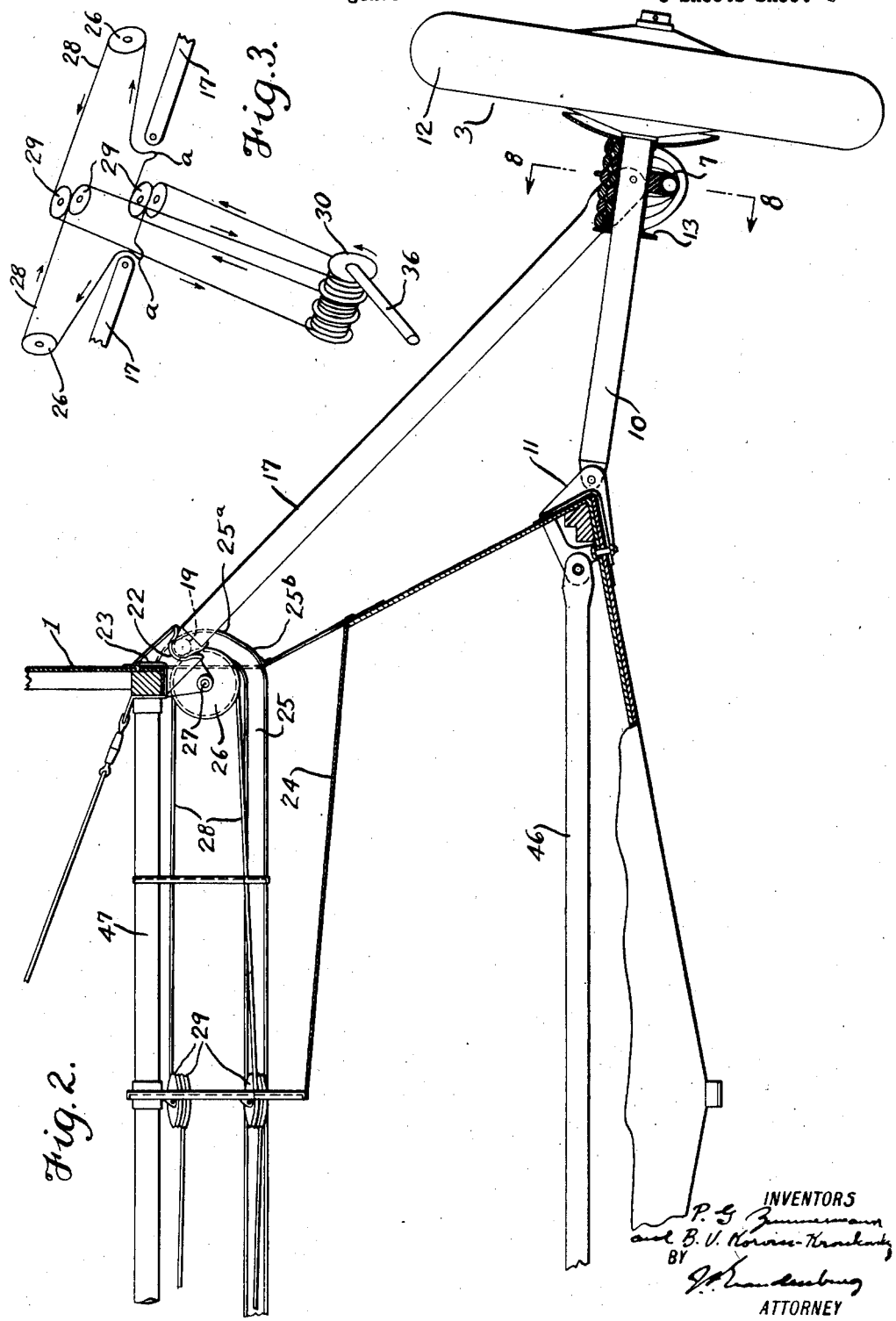

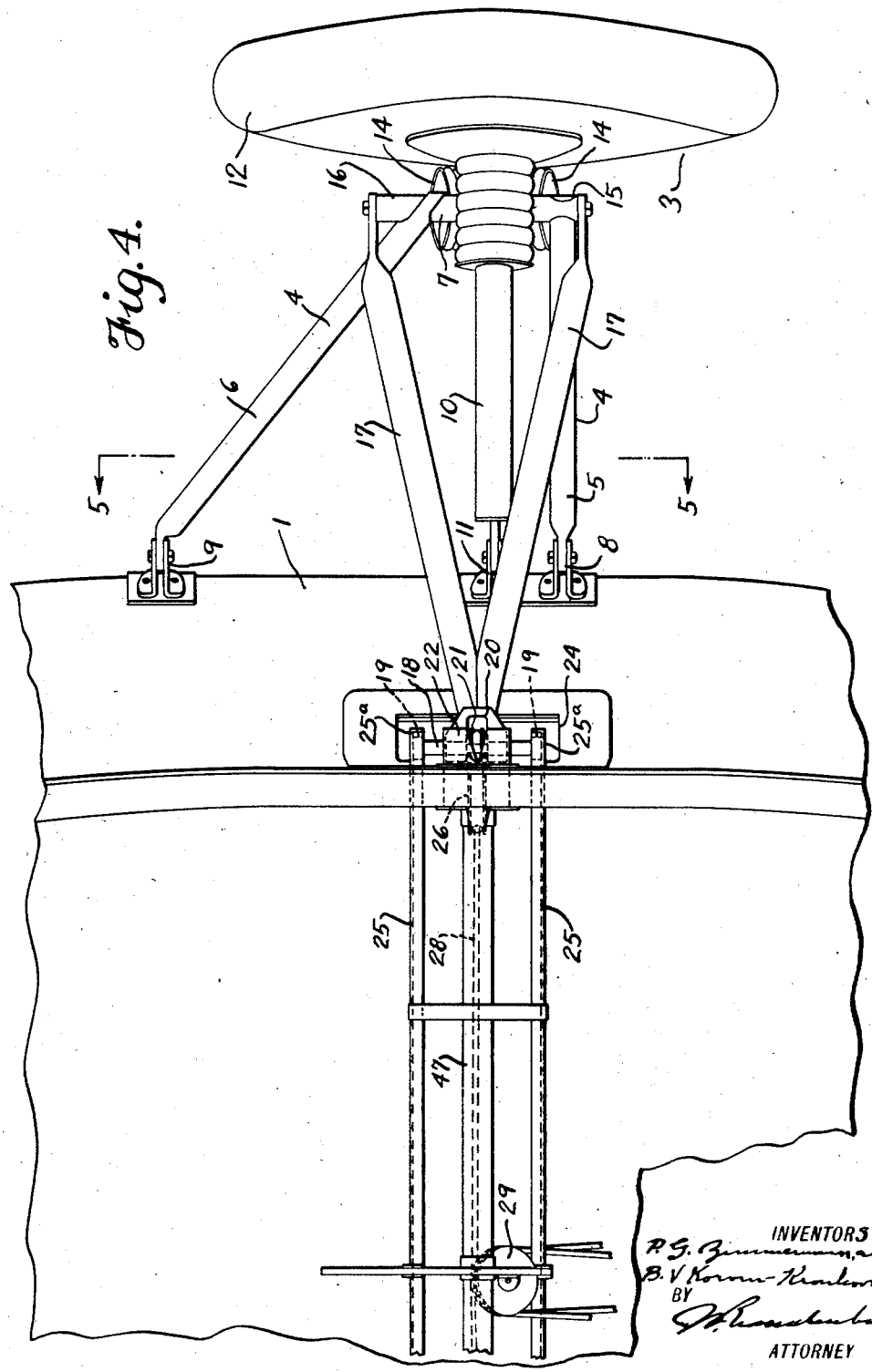

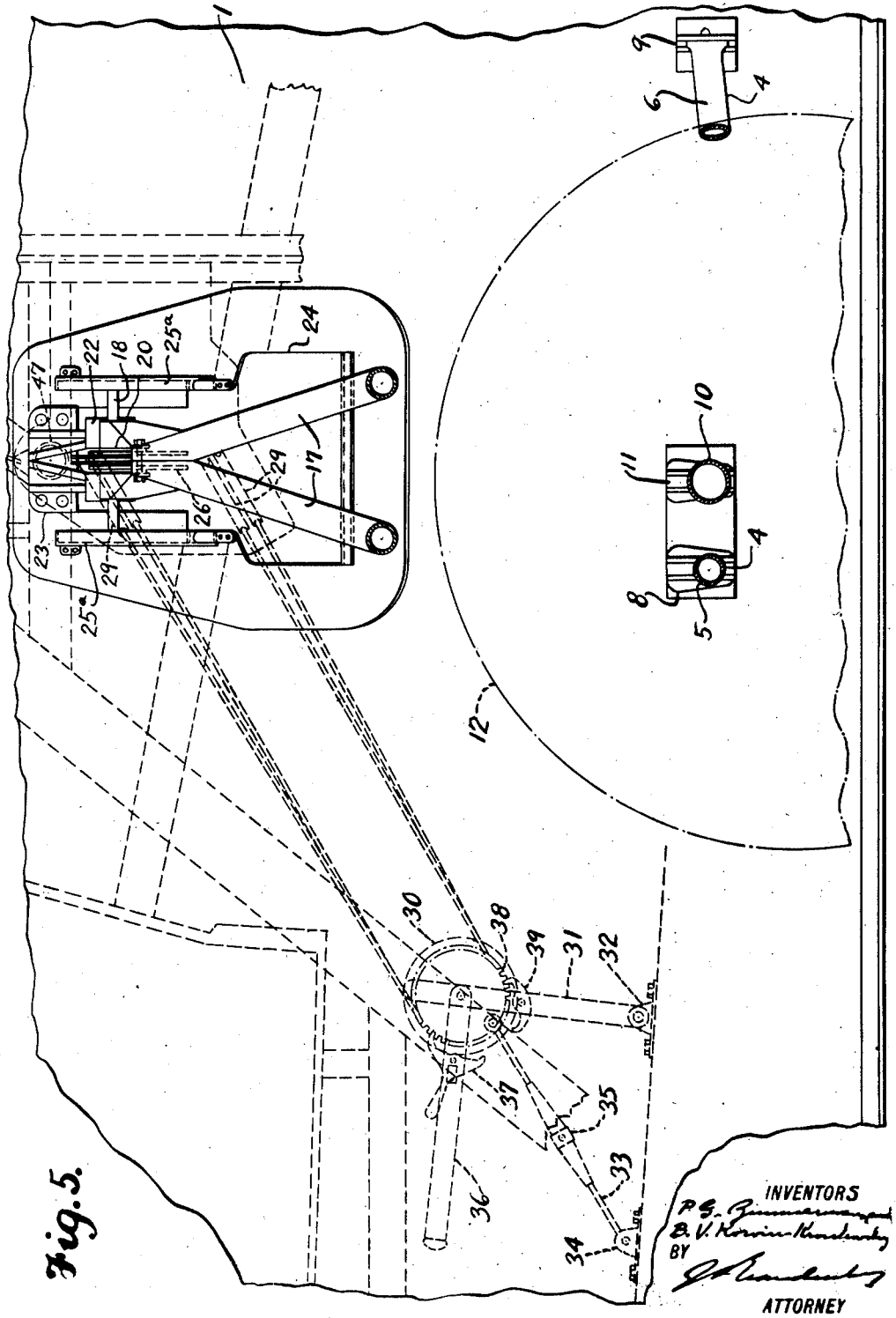

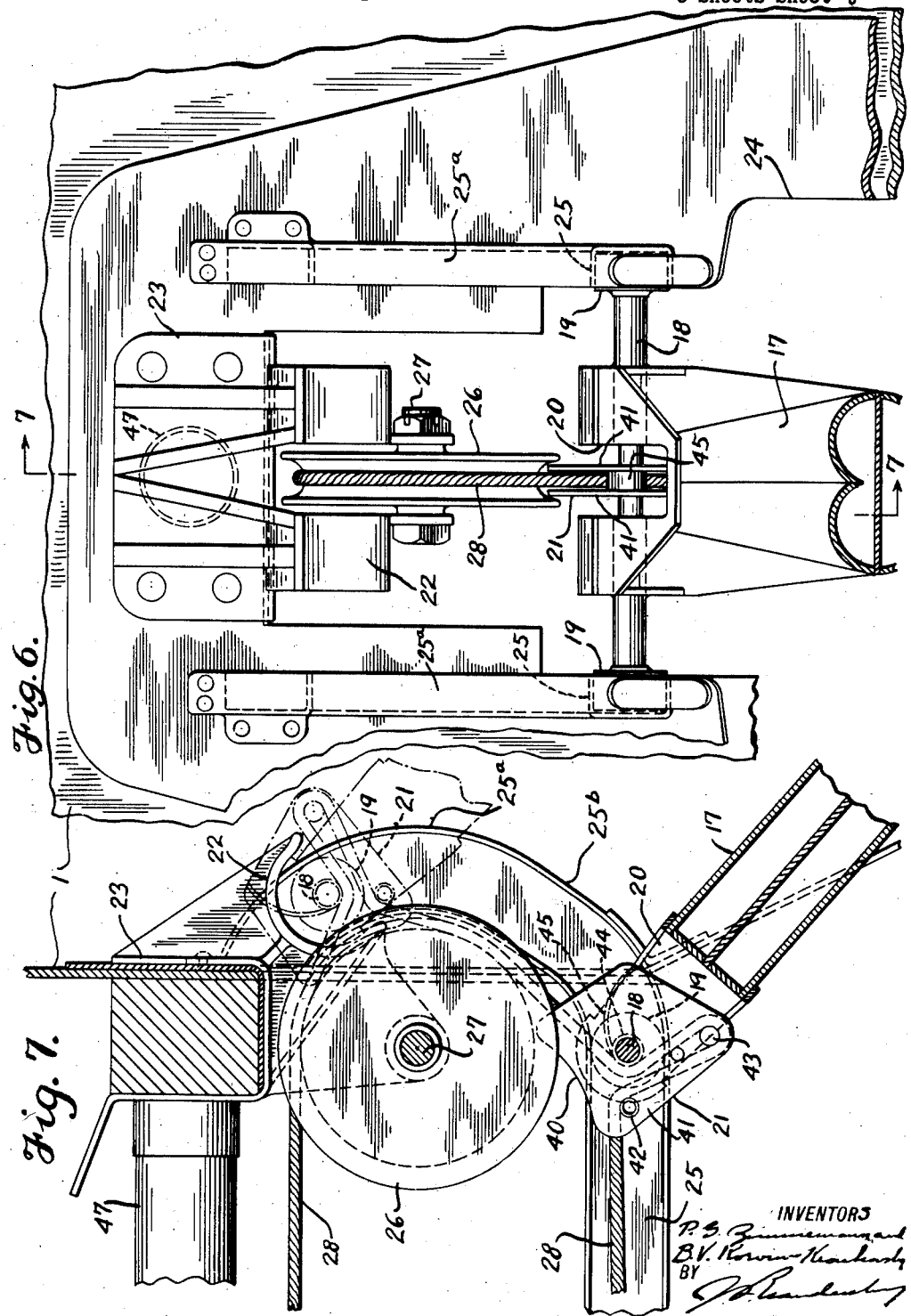

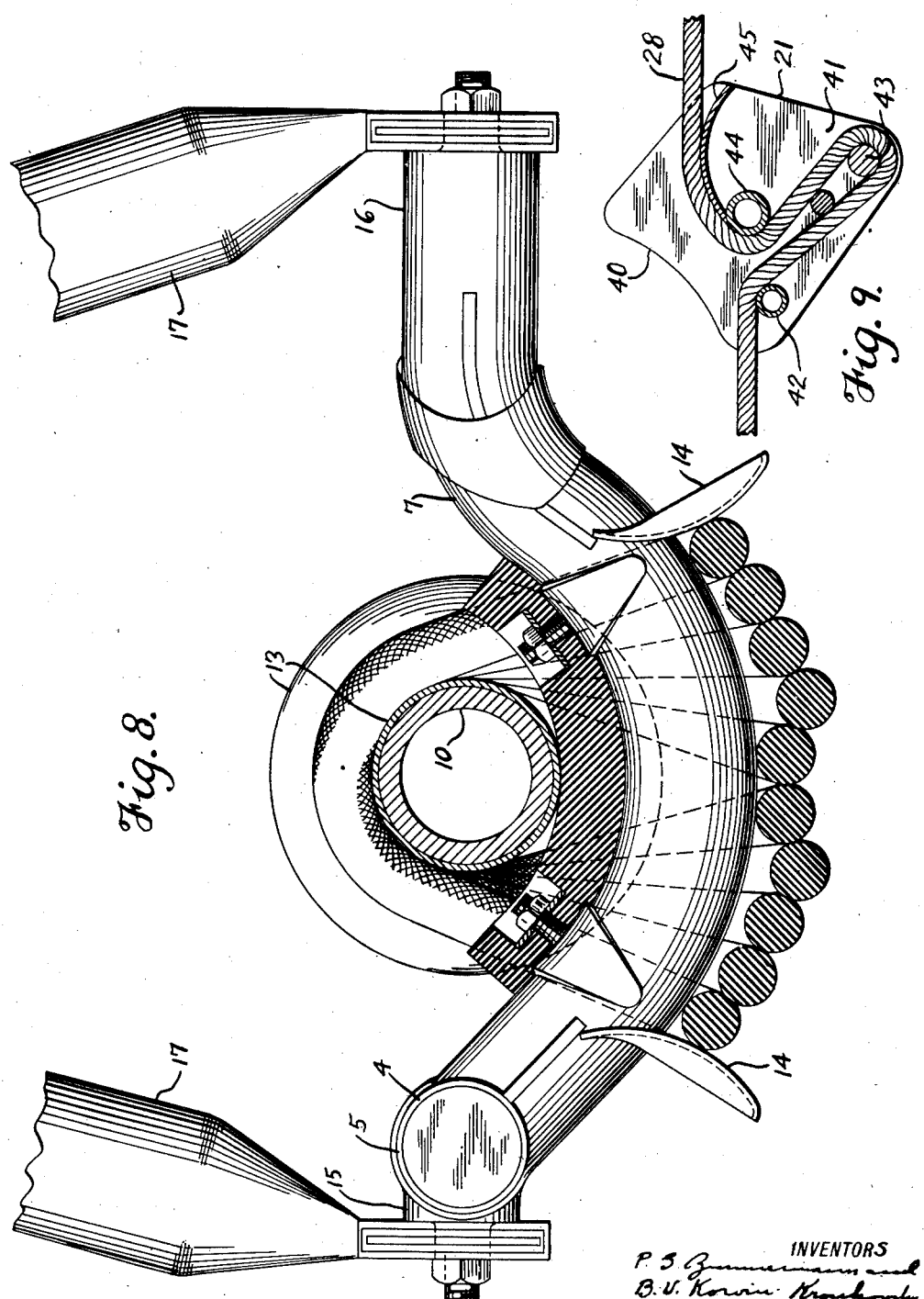

1,597,305

UNITED STATES PATENT OFFICE.

PAUL G. ZIMMERMANN AND BORIS V. KORVIN-KROUKOVSKY, OF KEYPORT, NEW JERSEY, ASSIGNORS TO AEROMARINE PLANE & MOTOR COMPANY, OF NEW YORK, N. Y., A CORPORATION OF NEW YORK.

RETRACTABLE LANDING GEAR.

Application filed November 17, 1922, Serial No. 601,467. Renewed March 27, 1925.

This invention relates to foldable or retractable landing gears for aeroplanes, and more particularly to a wheeled landing gear for flying boats or sea-planes the specific purpose being to enable the gear to be carried in a raised position where it will not interfere with alighting on the water, while permitting it to be readily placed and firmly sustained in position for landing on land. The object of the invention may be said to be to provide an effective landing gear of this character possessing lightness and low-head resistance combined with a high degree of structural strength. The invention comprises certain improvements and novel parts and combinations, which will be described now and hereinafter more particularly pointed out in the claims.

In the accompanying drawings forming a part hereof:

Fig. 1 is a front elevation of a flying-boat with its lower wings broken away and the upper ones omitted, and the landing gear shown in full lines in landing position, and in dotted lines in the retracted position;

Fig. 2 is an enlarged transverse section on a larger scale, showing one-half of the landing gear, the latter being partly in vertical transverse section;

Fig. 3 is a diagram of the cable mechanism;

Fig. 4 is a plan view corresponding to Fig. 2;

Fig. 5 is a side sectional elevation, the section being on the line 5—5 of Fig. 4, showing a portion of the hull broken away to reveal parts within;

Fig. 6 is a fragmentary side sectional elevation on a still larger scale;

Fig. 7 is a vertical transverse section on the line 7—7 of Fig. 6, illustrating two portions of a translatable strut and its cable clip in full and dotted lines, respectively;

Fig. 8 is a vertical longitudinal section on a much enlarged scale, taken on the line 8—8 of Fig. 2; and Fig. 9 is a sectional view of one of the clips seen in a different position from that of Fig. 7.

The drawings illustrate a flying-boat, having a hull or flotation body 1 and wings 2. On opposite sides of the flotation body are two halves 3 of an upwardly, foldable, retractable landing gear. The two halves are reversed duplicates, so that the description of one will apply to both.

A V-strut frame 4 extends laterally outward from the side of the hull, in the landing position, and is swung upward in the retracted position. This frame comprises front and rear members, 5, 6, united at their outer ends by a downwardly curved cradle 7. The front member may extend substantially at right angles to the length of the hull, while the rear member 6 is rearwardly inclined to resist the rearwardly acting component of the landing stress. The inner ends of these members are hinged to fittings 8, 9 on the side of the hull, the hinge axes being in longitudinal alinement.

An axle 10 is hinged to an intermediate fitting 11, near the fitting 8, its hinge axis being in alinement with the other. This axle likewise projects laterally in the landing condition, and is swung upward when the gear is retracted. Its outer end bears one of the landing wheels 12, and inwardly of the wheel it rests in the cradle 7, which passes beneath it. A spool 13 placed on this portion of the axle permits the axle to slide a short distance within it at the moment of landing; and an elastic is wrapped over this spool and beneath the cradle, being confined on the latter between ears 14.

Forward and rearward extensions 15, 16 are formed at the ends of the cradle, projecting beyond the members 5, 6 of the hinged strut frame 4, and to these extensions are pivoted the outer ends of the members of a bifurcated translatable and angularly movable strut 17.

The members of said strut converge toward the inner end, where they are united and carry a transverse rod 18, the ends of which rod form guide projections equipped with antifriction rollers 19. Mounted on the central portion of this rod, in a recess 20 in the inner end of the translatable strut, is a clip 21, suitably held against longitudinal displacement. The rod is capable of turning in the strut, or the clip upon the rod, whereby in either event the clip is pivoted on the strut, and the guide projections are in axial alinement with the pivoted axis.

In the landing position the strut 17 inclines inward and upward, and its inner end is rigidly sustained against a downwardly and outwardly facing abutment socket 22 said abutment being formed on a fitting 23 fixed to the side of the hull above and inwardly of the hinge fittings 8, 9, 11. To fold the landing gear upward out of the way of the water for alighting at sea, the strut 17 is removed from the abutment and drawn inwardly of the flotation body swinging to a substantially horizonal position as it passes inward.

To accommodate the translatable struts 17 of the two halves of the landing gear, a transverse pocket or pockets 24 are formed in the hull. In this pocket is a transverse guide consisting of front and rear channels 25, which receive the rollers 19 of the guide projections of the struts. At the outer ends of the guides at opposite sides of the hull are extensions 25$^a$, which are curved outward and upward to lead the ends of the struts to and from the abutment 22. Within the longitudinal projections of these curved guide extensions and adjacent the abutments, are lateral pulleys 26 turning on horizontal, fore and aft axles 27 carried by bracket lugs projecting downward from the fittings 23. A cable 28 passes about each of the pulleys 26 and thence in two stretches inwardly of the hull, the lower stretch extending adjacent and substantially parallel with the straight part of the guide 25.

Each of the clips 21 heretofore referred to is attached to one of the cables at such point thereon as to travel in and out with the lower transverse stretch of the cable and part way around the corresponding pulley 26 to the limit set by the abutment 22. A group of pulleys 29 are mounted substantially centrally, or intermediate the sides of the hull, on axes which lie in a vertical longitudinal plane, inclining downwardly and forwardly and rearwardly and upwardly, causing the pulley to lie in a skewed position. This group of pulleys comprises four wheels, independently rotatable. Mounted in the hull forwardly of these pulleys and below them is a drum 30, the axis of the drum being transverse to the length of the hull. As indicated in the diagram, Fig. 3, one lead of each cable passes from the point of attachment with its strut, said point being indicated by the bight $a$, inward to one of the central pulleys 29, and thence downward and forward to the drum; the other lead passes outward about the corresponding pulley 26, thence inward to another of the pulleys 29, and thence downward and forward to the drum. Two of the leads pertaining to the two halves of the landing gear are led to the drum to wrap thereon, while the other two leads are unwrapping, and vice-versa, depending upon the direction of rotation of the drum, the arrangement being such that turning of the drum in one direction causes the struts to move in opposite transverse directions, outward or inward as the case may be. The directions for projecting the struts and lowering the landing gears are indicated by arrows in the view. The surface of the drum may be divided into a suitable number of compartments as indicated in Fig. 3.

The drum is mounted on a support or stand 31 which is pivoted at its lower end on a fitting 32, in order that the drum may be displaced longitudinally of the hull. A stay 33 pivoted to the stand and extending forward and downward and pivoted to another fitting 34, holds the drum against the pull of the cables and enables slack in all the cables to be taken up by a single turnbuckle 35 in the stay, without the necessity for any turnbuckles in the cables themselves.

An operating lever is represented at 36, having a reversible pawl 37 to coact with a ratchet wheel 38 on the drum, and 39 is a reversible retaining pawl.

Each of the outer portions of the transversely extending part of the guide 25 is spaced somewhat below the cylindrical projection of the corresponding lateral pulley 26, and immediately above the lower bend the curved extension of the guide is swung inward to approach the projection of the periphery of the wheel, as represented at 25$^b$; above this the portion 25$^a$ is curved substantially concentrically with the pulley. In this way, the clip 21, the inner edge 40 of which is incurved or otherwise suitably formed to seat or saddle on the periphery of the wheel, is properly presented thereto without stretching the cable or causing it to bind.

The clip, as preferably formed, is made of two spaced plates 41 connected by posts 42, 43 and a tube 44 about the rod 18. The post 42 and the tube 44 are located near each other, and the post 43 at a distance, so that a narrow, non-slipping bight is formed in the cable by passing it in a loop between the post 42 and tube 44 and about the post 43. By this or similar means an un-severed portion of the cable is firmly secured to the clip in such manner as to permit of adjustment, and difficulties which would be encountered if ends of the cable were to be attached to the clip are avoided. A convex shelf, or equivalent deflecting device 45, in the clip, adjacent the bight-forming element 44 causes the free portion of the cable adjoining the bight to be drawn over its convexity when the clip is in the straight stretch of the cable, but permits said portion of the cable to rise from the shelf when the clip comes to the pulley 26. This compensates for the tendency to bind which would otherwise occur as the clip travels in the course prescribed by the guide and the pulley.

The sets of fittings 8, 9, 11 and 23 at opposite sides of the hull are applied at the opposite ends of corresponding lower and upper interior cross-members 46, 47 which take the strain off the sides of the hull.

While we have described in the foregoing the preferred embodiment of our invention and its mode of operation, it will be understood that numerous changes may be made in the form, proportions, arrangements and details without departing from essentials.

What we claim as new is:

1. A retractable landing gear for aircraft having a flotation body, comprising an axle hinged to the body to extend laterally therefrom, a strut frame likewise hinged to the body to extend laterally and having an outer portion passing under the axle, an elastic connection between the axle and said portion, a translatable strut pivoted to the outer end of the hinged strut frame, adapted to incline upward and inward therefrom in the landing condition and to be drawn inwardly of the body in order to fold the landing gear upwardly, and an abutment for sustaining the inner end of the translatable strut when in the landing position.

2. A retractable landing gear for aircraft having a flotation body, comprising an axle hinged to the body to extend laterally therefrom, a strut frame likewise hinged to the body to extend laterally and having an outer portion passing under the axle, an elastic connection between the axle and said portion, a translatable strut pivoted to the outer end of the hinged strut frame, adapted to incline upward and inward therefrom in the landing condition and to be drawn inwardly of the body in order to fold the landing gear upwardly, and an abutment for sustaining the inner end of the translatable strut when in the landing position and means for removing the end of the strut from the fixed abutment and drawing it inwardly of the body and projecting the strut and replacing it at the abutment, at will.

3. A retractable landing bear for aircraft, having a flotation body, comprising an axle hinged to the body to extend laterally, a strut frame likewise hinged to the body to extend laterally and comprising a front member, a rearwardly inclined back member and a cradle uniting the outer ends of said members, a spool on the outer portion of the axle resting in the cradle, the axle being slidable lengthwise in the spool, an elastic wrapped about the cradle and spool, a translatable strut pivoted to the outer end of the hinged strut frame, adapted to incline upward and inward therefrom in the landing condition and to be drawn inwardly of the body in order to fold the landing gear upwardly, and an abutment for sustaining the inner end of the translatable strut when in the landing position.

4. A retractable landing gear for air craft having a flotation body, comprising an axle hinged to the body to extend laterally therefrom, a strut frame likewise hinged to the body to extend laterally and comprising a front member, a rearwardly inclined back member, a cradle for the axle uniting the outer ends of said members and front and rear extensions at the ends of the cradle, an elastic wrapped over the axle and under the cradle, a bifurcated translatable strut having the outer ends of its members pivoted to said extensions, said strut thence inclining upward and inward in the landing condition and being adapted to be drawn inwardly of the body to fold the landing gear upwardly, and an abutment for the inner end of the translatable strut when in the landing position.

5. In an aircraft having a flotation body and a wheeled upwardly foldable landing gear connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, a tranverse guide for the strut bent upward at its outer end to present the strut to the abutment, and a cable for moving the end of the strut in and out along the guide upward to and downward from the abutment.

6. In an aircraft having a flotation body and a wheeled upwardly foldable landing gear connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, a pulley on the body adjacent the abutment, and an operating cable passing about the pulley and thence inwardly of the body, the inner end of the strut being attached to said cable so as to be movable transversely outward and inward of the body and partway around the pulley upward to and downward from the abutment.

7. In an aircraft having a flotation body and a wheeled upwardly foldable landing gear connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, a pulley on the body adjacent the abutment, a guide extending transversely of the body below the pulley and having an extension leading outward and upward and about the pulley to the abutment, a cable passing about the pulley and thence inwardly of the body, operating means for moving said cable in opposite directions at will, and element on the inner end of the strut comprising a clip engaged with said cable and a projection cooperative with the guide.

8. In an aircraft having a flotation body and a wheeled upwardly foldable landing gear connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, a pulley on the body adjacent the abutment, an operating cable passing about the pulley and thence inwardly of the body, and a clip pivoted on the inner end of the strut and having elements between and about which the cable is passed to form a narrow non-slipping bight.

9. In an aircraft having a flotation body and a wheeled upwardly foldable landing gear connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, a pulley on the body adjacent a portion extending transversely of the body and spaced below the pulley and an extension bent upward about the pulley toward the abutment, said extension comprising a lower portion swinging in toward the periphery of the pulley and an upper portion following the curvature thereof, an operating cable passing about the pulley and thence inwardly of the body, a clip having means defining a non-slipping bight of the cable, said clip being pivoted on the inner end of the strut and formed to cooperate with the periphery of the pulley, and a guide projection coaxial with the pivotal axis of the clip movable on said guide.

10. In an aircraft having a flotation body and a wheeled upwardly foldable landing gear connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, a pulley on the body adjacent the abutment, a guide extending transversely of the body below the pulley and having an extension leading outward and upward and about the pulley to the abutment, a cable passing about the pulley and thence inwardly of the body, a clip pivoted on the inner end of the strut and having means defining a non-slipping bight of the cable, and being further provided with a convex shelf over which a portion of the cable adjoining the bight is drawn in the straight stretch, to be raised therefrom when the clip comes to the pulley, and a guide projection likewise on the inner end of the strut to travel on said guide.

11. In a retractable landing gear, and in combination with a translatable and angularly movable strut forming a part thereof, an operating cable and a clip pivoted on the end of the strut and having means defining a non-slipping bight of the cable.

12. In a retractable landing gear, and in combination with a translatable and angularly movable strut forming a part thereof, an operating cable, a pulley about which the cable passes a guide for the end of the strut, and a clip pivoted on the end of the strut and engaged with the cable, said clip having a convex shelf over which a portion of the cable is drawn in the straight stretch, to be raised therefrom as the clip comes to the pulley.

13. In an aircraft having a flotation body and a wheeled upwardly foldable landing gear in two halves connected with opposite sides of the body, translatable struts forming part of the two landing gear halves, said struts inclining upward and inward from the outer portions of the landing gear halves in the landing position and being withdrawable inwardly of the body to fold the gear, fixed abutments on the sides of the body for sustaining the inner ends of said struts in the landing positions, a guide for the ends of the struts, lateral pulleys adjacent the abutment, central pulleys, an operating drum, and a cable attached to each strut and thence passing in one direction about a central pulley and to the drum, and in the opposite direction about a lateral pulley, thence to a central pulley and to the drum, the whole being arranged so that rotation of the drum in one direction produces movement of the struts in opposite transverse directions.

14. In an aircraft having a flotation body and a wheeled upwardly foldable landing gear connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, an operating cable to which the inner end of the strut is attached, suitable guides for the cable, a drum to which the leads of the cable passing in opposite directions from its attachment to the struts are eventually led, and means whereby the drum is shiftable to take up slack in the cable.

15. In an aircraft having a flotation body and a wheeled upwardly foldable landing gear, connected with the side of the body, a translatable strut forming part of the landing gear, said strut inclining upward and inward from the outer portion of the landing gear in the landing position and being withdrawable inwardly of the body to fold the gear, an abutment on the body for sustaining the inner end of said strut in the landing position, an operating cable to which the inner end of the strut is attached, suitable guides for the cable, a drum to which the leads of the cable passing in opposite directions from its attachment to the struts are eventually led, a tiltable support for the drum, and a stay for said support containing adjusting means.

16. In an aircraft having a flotation body and a wheeled upwardly foldable landing gear in two halves connected with the opposite sides of the body, translatable struts forming part of the two landing gear halves, said struts inclining upward and inward from the outer portions of the landing gear halves in the landing position and being withdrawable inwardly of the body to fold the gear, fixed abutments on the sides of the body for sustaining the inner ends of said struts in the landing positions, a guide for the ends of the struts, lateral pulleys adjacent the abutment, central pulleys, an operating drum, and a cable attached to each strut and thence passing in one direction about a central pulley and to the drum, and in the opposite direction about a lateral pulley, thence to a central pulley and to the drum, the whole being arranged so that rotation of the drum in one direction produces movement of the struts in opposite transverse directions, a support for the drum movable longitudinally of the body, and means for adjusting said support to take up slack in all cables.

PAUL G. ZIMMERMANN.
B. V. KORVIN-KROUKOVSKY.